United States Patent
Uscumlic et al.

(10) Patent No.: US 11,528,347 B2
(45) Date of Patent: Dec. 13, 2022

(54) INTER-PACKET COMMUNICATION OF MACHINE LEARNING INFORMATION

(71) Applicant: Nokia Solutions and Networks Oy, Espoo (FI)

(72) Inventors: Bogdan Uscumlic, Les Ulis (FR); Gopalasingham Aravinthan, Savigny sur Orge (FR); Lionel Natarianni, Nogent-sur-Marne (FR)

(73) Assignee: Nokia Solutions and Networks Oy, Espoo (FI)

( * ) Notice: Subject to any disclaimer, the term of this patent is extended or adjusted under 35 U.S.C. 154(b) by 173 days.

(21) Appl. No.: 16/911,671

(22) Filed: Jun. 25, 2020

(65) Prior Publication Data

US 2021/0409524 A1 Dec. 30, 2021

(51) Int. Cl.
*H04L 69/22* (2022.01)
*H04L 49/101* (2022.01)
*H04L 47/24* (2022.01)
*H04L 47/62* (2022.01)

(52) U.S. Cl.
CPC .............. *H04L 69/22* (2013.01); *H04L 47/24* (2013.01); *H04L 47/62* (2013.01); *H04L 49/101* (2013.01)

(58) Field of Classification Search
CPC ...... G06K 9/6262; G06N 20/00; G06F 30/27; G06F 40/44; H04L 69/22; H04L 47/24; H04L 47/62; H04L 49/101; H04L 41/16
See application file for complete search history.

(56) References Cited

U.S. PATENT DOCUMENTS

| | | | | |
|---|---|---|---|---|
| 2008/0162520 | A1* | 7/2008 | Sarwar | G06F 16/285 |
| 2010/0017487 | A1* | 1/2010 | Patinkin | G06Q 10/107 |
| | | | | 709/206 |
| 2010/0082513 | A1* | 4/2010 | Liu | G06N 3/006 |
| | | | | 706/46 |
| 2018/0192046 | A1* | 7/2018 | Teo | H04N 19/176 |
| 2019/0018955 | A1* | 1/2019 | McGrew | H04L 63/1425 |

(Continued)

OTHER PUBLICATIONS

"Design Space Exploration with Deterministic Latency Guarantees for Crossbar MPSoC Architectures"; Uscumlic et al.; ICC 2020—2020 IEEE International Conference on Communications (ICC); Jun. 7, 2020 (Year: 2020).*

(Continued)

*Primary Examiner* — Benjamin H Elliott, IV
(74) *Attorney, Agent, or Firm* — Tong, Rea, Bentley & Kim, LLC

(57) ABSTRACT

A network switch includes one or more queues to hold packets received from a first input flow and a second input flow. The network switch also includes a packet communication switch configured to access a first header of a first packet in the one or more queues and a second header of a second packet in the one or more queues. The first header includes first machine learning (ML) information that represents a first set of state transition probabilities under a set of actions performed at the network switch. The second header includes second ML information that represents a second set of state transition probabilities under the set of actions performed at the network switch. The packet communication switch is configured to selectively modify the first header or the second header based on a comparison of the first ML information and the second ML information.

22 Claims, 11 Drawing Sheets

(56) References Cited

U.S. PATENT DOCUMENTS

| | | | |
|---|---|---|---|
| 2019/0150150 A1* | 5/2019 | Calin | H04W 72/0453 |
| | | | 370/329 |
| 2019/0258938 A1* | 8/2019 | Mnih | G06N 3/084 |
| 2019/0296922 A1* | 9/2019 | Dutta | H04L 45/745 |
| 2019/0394527 A1* | 12/2019 | Chandrasekhar | H04L 47/2441 |
| 2020/0218751 A1* | 7/2020 | Latapie | H04L 41/16 |
| 2020/0313999 A1* | 10/2020 | Lee | H04L 69/22 |
| 2020/0358685 A1* | 11/2020 | Gupta | H04L 43/0852 |
| 2020/0406910 A1* | 12/2020 | Ruan | H04L 43/0852 |
| 2020/0412659 A1* | 12/2020 | Arditti Ilitzky | H04L 47/125 |
| 2021/0160268 A1* | 5/2021 | Anderson | H04L 63/1425 |
| 2021/0203621 A1* | 7/2021 | Ylisirniö | H04L 45/50 |
| 2021/0234769 A1* | 7/2021 | Ganapathi | H04L 43/062 |
| 2021/0304027 A1* | 9/2021 | Damodaran | G06N 5/04 |
| 2021/0320880 A1* | 10/2021 | Sodani | H04L 47/564 |
| 2021/0328930 A1* | 10/2021 | Nikolaidis | H04L 47/127 |
| 2021/0409524 A1* | 12/2021 | Uscumlic | H04L 69/22 |

OTHER PUBLICATIONS

"Re-factored Operational Support Systems for the Next Generation Platform-as-a-Service"; Veitch et al. 2018 IEEE 5G World Forum (5GWF); Jul. 9, 2018 (Year: 2018).*

Yu et al., "DROM: Optimizing the Routing in Software-Defined Networks with Deep Reinforcement Learning", IEEE Access, vol. 6, Oct. 23, 2018, 7 pages.

Wang et al., "Deep Reinforcement Learning for Scheduling in Cellular Networks", arXiv: 1905.05914v2, arXiv.org, Jul. 23, 2019, 6 pages.

"Traffic Management", http://istio.io/doc/concepts/traffic-management/, Accessed: May 4, 2020, 15 pages.

* cited by examiner $$Q = \begin{bmatrix} 0 & a & 0 & 0 & 0 & 0 & 0 \\ 0 & 0 & c & 0 & 0 & g & 0 \\ 0 & b & 0 & e & 0 & h & 0 \\ 0 & 0 & 0 & 0 & 0 & 0 & 0 \\ 0 & 0 & 0 & d & f & i & 0 \\ 0 & 0 & 0 & 0 & 0 & 0 & 0 \end{bmatrix}$$

900

$$Q' = \begin{bmatrix} 0 & a' & 0 & 0 & 0 & 0 \\ 0 & b' & 0 & e' & 0 & j' \\ 0 & 0 & c' & 0 & h' & k' \\ 0 & 0 & 0 & f' & 0 & 0 \\ 0 & 0 & d' & g' & i' & l' \\ 0 & 0 & 0 & 0 & 0 & m' \end{bmatrix}$$

INTER-PACKET COMMUNICATION OF MACHINE LEARNING INFORMATION

BACKGROUND

Computer networks include network switches that receive packets over an incoming (upstream) link and direct the received packets towards a next hop in the downstream direction. In some cases, the network switches are arranged as a mesh of interconnected switches. A network switch typically includes multiple queues that hold packets received from different incoming links. A scheduler then selectively schedules packets for transmission from the queues to their corresponding next hops. The performance of the schedulers in the network switches is assessed based on factors such as the latencies of the packets transmitted to the network, congestion in the network, occupancy of the queues in the network switch, overflow or underflow of the queues in the network switch, and the like. Constraints on these factors are strict in networks that operate according to Fifth Generation (5G) standards. For example, 5G networks support Ultra-Reliable Low Latency Communication (URLLC) that targets end-to-end latencies of 1 millisecond (ms) (e.g., to support factory automation applications) and reliabilities of at least 99.999% (e.g., for automotive traffic control applications such as platooning). Most of the signal processing in a 5G communication system is done in the network by cloud servers rather than close to the radio antennas that support wireless communication, e.g., with IoT devices. The latency requirements for the cloud server architecture are even more stringent: round trip time budgets are expected to be in the range of 200 to 500 microseconds (μs).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 9 illustrates two value learning matrices in different evolutionary states according to some embodiments.

DETAILED DESCRIPTION

Figure 1:
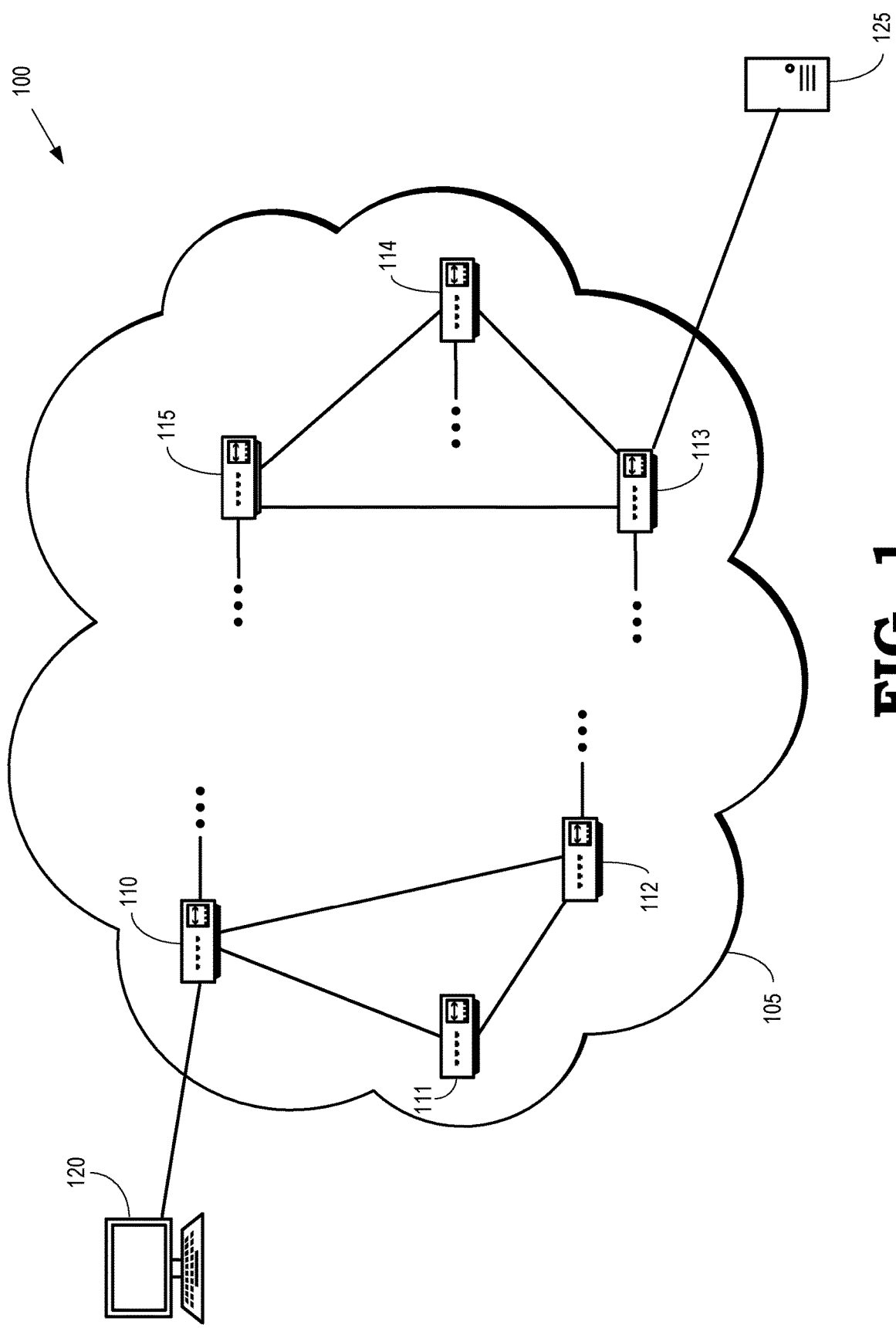
FIG. 1 is a diagram of a communication system that supports communication of machine learning (ML) information between packets that are traversing the communication system according to some embodiments.

Network switches implement machine learning (ML) techniques such as reinforcement learning to configure data plane, control plane, or management plane functionality in the network switch. For example, a scheduler in the data plane of the network switch implements ML techniques to improve its decision-making processes such as deciding among different options for the next hop of a packet in a queue. Reinforcement learning learns probabilities of transitions between different states of a system under a set of actions based on a reward that is generated after a transition between the states under one of the actions in the set of actions. A scheduler in a network switch that implements reinforcement learning is trained to forward packets from one of the queues in the network switch (a first action) to one of a group of potential next hops (thereby changing the state of the network) based on feedback from the system (a reward) such as an indication of the packet latency along the path chosen by the scheduler. For example, a value learning matrix that represents the state transition probabilities under a set of scheduling actions performed at the network switch are updated in response to each scheduling decision based on the feedback from the network. Subsequent scheduling decisions are then made based on the updated value learning matrix. However, the time required to generate an accurate value learning matrix is significant because each scheduler in each network switch in the network independently generates value learning matrices for different processes. For example, network switches in a 5G network "learn" different value learning matrices for different service chains established in the 5G network. For another example, hybrid access gateways that implement multipath transmission control protocol (MPTCP) maintain different value learning matrices for different MPTCP flows that utilize the disjoint (wired or wireless) paths through the network.

FIGS. 1-11 disclose techniques for accelerating machine learning in network switches by adding ML information to headers of packets that are traversing the network and exchanging the ML information between packets in different queues at the network switches. Some embodiments of the network are implemented as a mesh network. The information exchanged between the packets in the queues of the network switches are used to evaluate the state of the network switch and configure data plane, control plane, or management plane functionality in the network switch. For example, in the data plane, the exchanged ML information can be used to update parameters of ML algorithms that schedulers in the network switches use to schedule transmissions of packets from the queues in the network switches. In some embodiments, the network switches use reinforcement learning to determine values of entries in a value learning matrix that represent state transition probabilities under a set of actions performed at the network switch. The values of the entries are updated in response to each action taken at the network switch based on the feedback from the system. The network switch performs subsequent actions based on the updated value learning matrix, e.g., the scheduler makes subsequent scheduling decisions based on the updated value learning matrix. The network switch also appends headers including the updated ML information to packets (or modifies the existing ML headers in the packets) that are transmitted from the network switch. Other examples include monitoring congestion of the queues, monitoring of certain classes of services, monitoring of energy consumption, the available hardware resources, the availability of the acceleration devices, the number of treated traffic flows, and the like.

A packet communication switch in the network switch supports the exchange of ML header information between packets queued in different queues of the network switch. In some embodiments, the packet communication switch includes an interconnection matrix that physically connects packets in the different queues, an execution block that selects packets in the different queues for ML header exchange, and (optionally) a local ML algorithm that evolves values of the exchanged ML headers. To avoid adding latency, the packet communication switch allows packets in the different queues to communicate as long as the service time remaining for the head-of-line (HOL) packets is above a threshold that allows the exchange of ML headers to complete before the corresponding packets are scheduled for transmission. During the communication, the packet having a less evolved value learning matrix updates its value learning matrix based on the ML header of the packet having the more evolved value learning matrix. In some embodiments, the packets also exchange information indicating the number of iterations of the reinforcement learning process that produced the value learning matrix. Some embodiments of the distributed ML processing discussed herein are employed in 5G service chaining, MPTCP hybrid access gateways, and the like.

FIG. 1 is a diagram of a communication system 100 that supports communication of ML information between packets that are traversing the communication system 100 according to some embodiments. The communication system 100 includes a network 105 such as a mesh network that includes network switches 110, 111, 112, 113, 114, 115, which are collectively referred to herein as "the network switches 110-115." The communication system 100 supports communication between entities that are connected to the network 105 such as the client 120 and the server 125. Information is communicated between the client 120 and the server 125 using packets that are transmitted via the network 105. The packets are received by one or more of the network switches 110-115 and forwarded to the next hop network switch 110-115 until the packet reaches a last hop network switch 110-115, which transmits the packet to the destination, e.g., the client 120 or the server 125.

As discussed herein, the network switches 110-115 include sets of queues to hold packets received from input flows (e.g., from one of the other network switches 110-115, the client 120, or the server 125) prior to forwarding the received packet towards its destination. The packets conveyed through the network 105 include a header and a payload. The header includes ML information such as a value learning matrix that represents state transition probabilities under a set of actions performed at the network switches 110-115. Packets in the queues can communicate or "talk" with each other by exchanging the ML information in their respective headers. In some cases, the "more evolved" information in one of the headers is used to update the "less evolved" information in the other header. As used herein, the term "evolved" refers to changes in the ML information that are produced by the corresponding ML learning process, such as reinforcement learning based on feedback from the network 105. The ML information is used to configure the network switches 110-115 to perform actions including scheduling, chaining of service flows in a Fifth Generation (5G) network, allocating service flows in a hybrid access gateway, monitoring congestion of the queues in the network switches 110-115, monitoring of certain classes of services provided by the network 105, monitoring of energy consumption of the network switches 110-115, allocating available hardware resources of the network switches 110-115, determining availability of acceleration devices to the network switches 110-115, managing/allocating the number of treated traffic flows, and the like.

Figure 2:
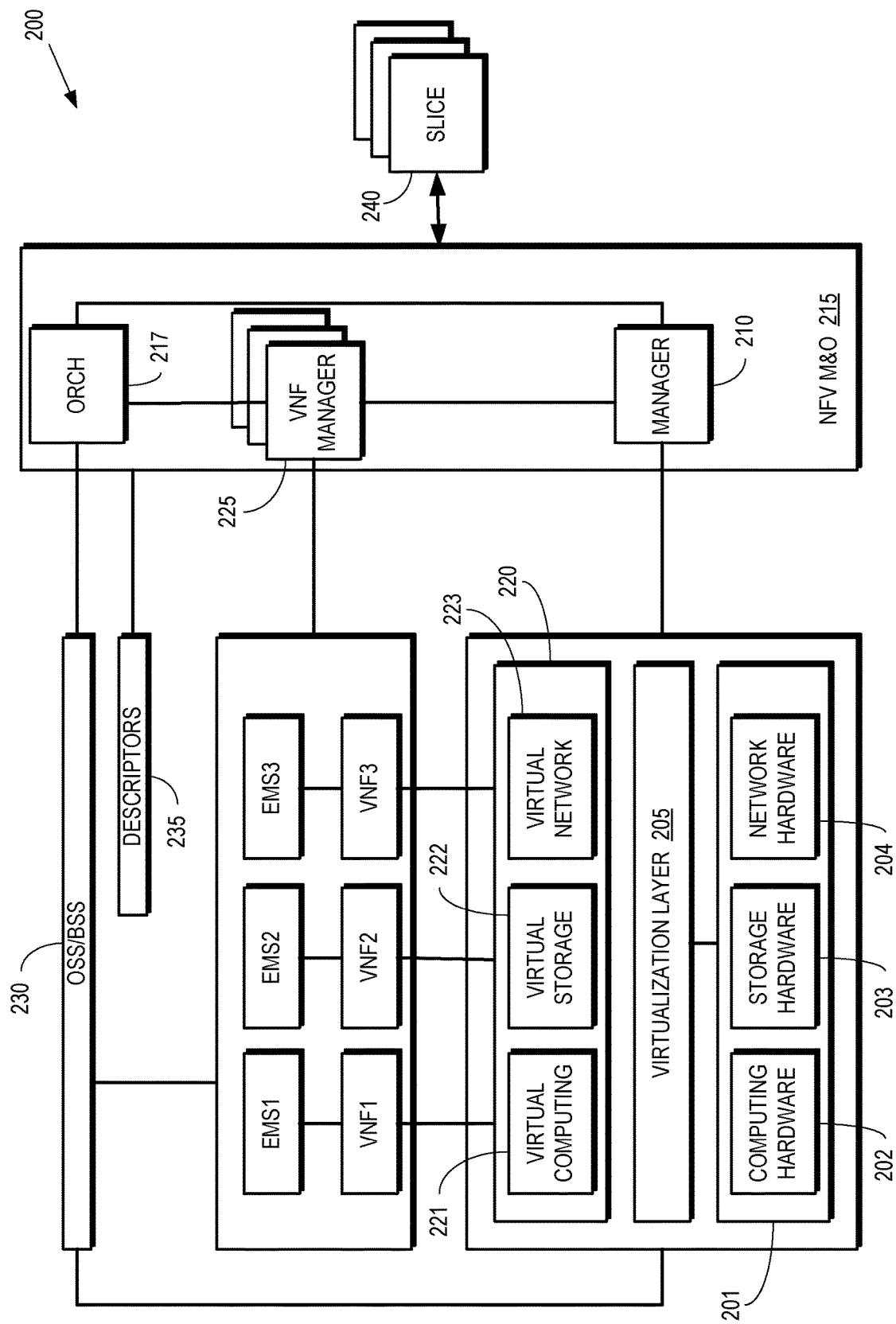
FIG. 2 is a block diagram of a network function virtualization (NFV) architecture according to some embodiments.

FIG. 2 is a block diagram of a network function virtualization (NFV) architecture 200 according to some embodiments. The NFV architecture 200 is used to implement some embodiments of the communication system 100 shown in FIG. 1. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of an NFV management and orchestration (M&O) module 215. Some embodiments of the virtualized infrastructure manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) are implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the virtualized infrastructure manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the NFV M&O 215.

The NFV architecture 200 can be used to implement network slices 240 that provide user plane or control plane functions such as service functions that are implemented in 5G networks, e.g., in a 5G service chain. A network slice 240 is a complete logical network that provides communication services and network capabilities, which can vary from slice to slice. User equipment can concurrently access multiple network slices 240. Some embodiments of user equipment provide Network Slice Selection Assistance Information (NSSAI) parameters to the network to assist in selection of a slice instance for the user equipment. A single NSSAI may lead to the selection of several network slices 240. The NFV architecture 200 can also use device capabilities, subscription information and local operator policies to do the selection. An NSSAI is a collection of smaller components, Single-NSSAIs (S-NSSAI), which each include a Slice Service Type (SST) and, in some embodiments, a Slice Differentiator (SD). Slice service type refers to an expected network behavior in terms of features and services (e.g., specialized for broadband or massive IoT), while the slice differentiator can select among several network slice instances of the same type, e.g. to isolate traffic related to different services into different network slices 240.

Figure 3:
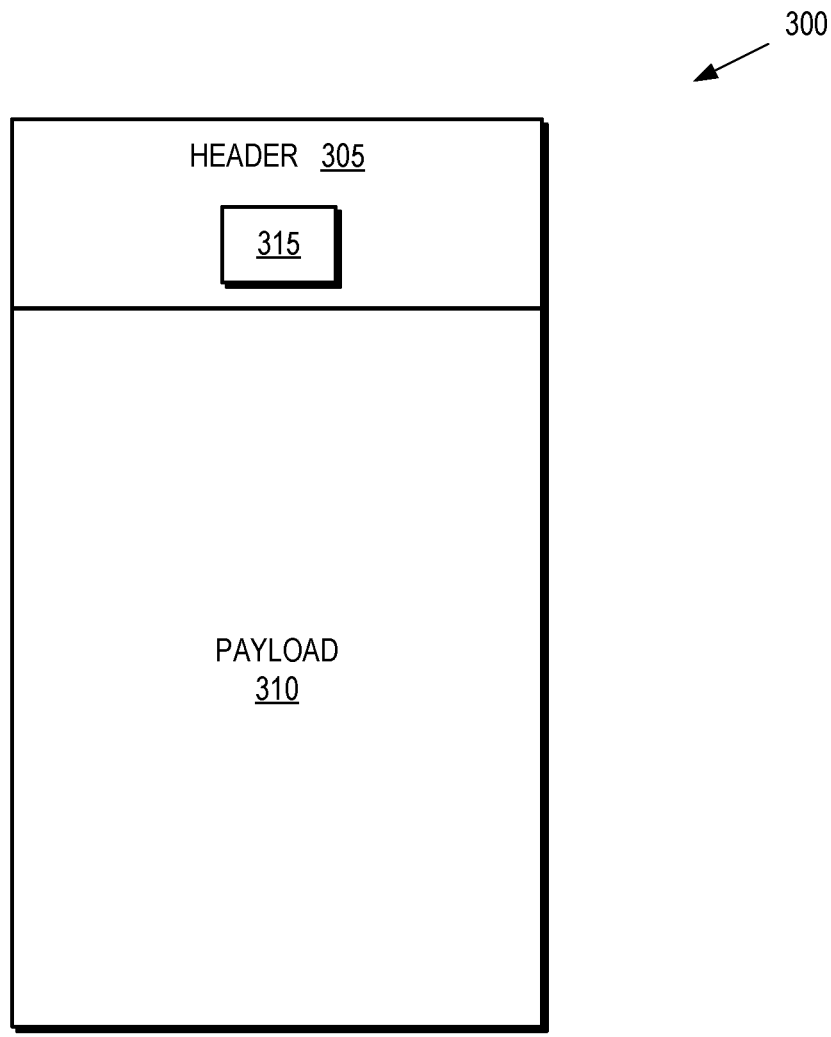
FIG. 3 is a block diagram of a packet that includes ML information for exchange with other packets traversing a network according to some embodiments.

FIG. 3 is a block diagram of a packet 300 that includes ML information for exchange with other packets traversing a network according to some embodiments. The packet 300 is conveyed through some embodiments of the communication system 100 shown in FIG. 1 using the switches 110-115 shown in FIG. 1. The packet 300 includes a header 305 and a payload 310. The header 305 includes ML information 315 that represents state transition probabilities under a set of actions performed at a network switch that processes the packet 300 such as one of the network switches 110-115 shown in FIG. 1. Some embodiments of the ML information 315 include one or more value learning matrices that have entries corresponding to transition probabilities for corresponding states of the system under corresponding actions. The value learning matrices are trained based on feedback (such as rewards in the case of reinforcement learning) received from the network in response to taking an action. As discussed herein, the ML information 315 can be exchanged with ML information stored in other packets received at other queues of the network switch. The ML information 315 can also be updated or modified based on the ML information stored in other packets or ML information stored at the network switch.

Figure 4:
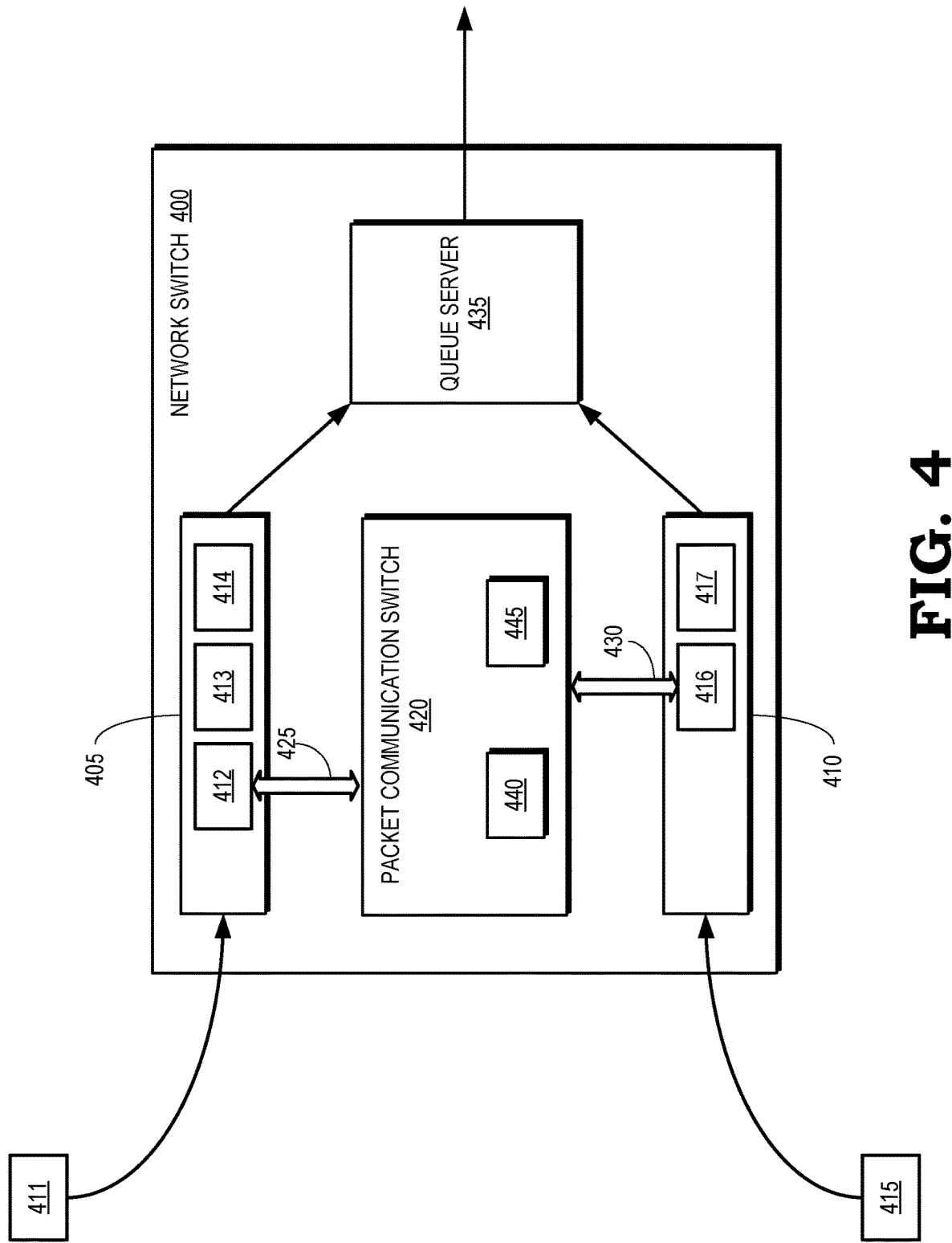
FIG. 4 is a block diagram of a network switch that supports inter-packet communication of ML information between packets received at the network switch according to some embodiments.

FIG. 4 is a block diagram of a network switch 400 that supports inter-packet communication of ML information between packets received at the network switch 400 according to some embodiments. The network switch 400 is used to implement some embodiments of the network switches 110-115 shown in FIG. 1. The network switch 400 includes a set of queues 405, 410 that receive and store packets associated with different input flows such as the packets 411, 412, 413, 414, 415, 416, 417, which are collectively referred to herein as "the packets 411-417." Although the set of queues 405, 410 shown in FIG. 4 includes two queues, some embodiments of the network switch 400 implement additional queues that are also support inter-packet communication of ML information, as discussed herein.

A packet communication switch 420 selects packets from the queues 405, 410 and provides a communication pathway between the selected packets. In the illustrated embodiment, the packet communication switch 420 provides communication pathways 425, 430 that allows information in the headers of the packets 412, 416 to be compared, exchanged, updated, or modified. Although the inter-packet communication illustrated in FIG. 4 includes communication between the packets 412, 416 in different queues 405, 410, some embodiments of the packet communication switch 420 support inter-packet communication between packets within the same queue. For example, the packet communication switch 420 can support inter-packet communication between the packets 412, 413 in the queue 405.

In the illustrated embodiment, the packets 412, 416 are selected for inter-packet communication based on their position in the queues 405, 410 relative to the head-of-line (HOL) of the respective queues 405, 410. The packets 412, 416 should be far enough away from the HOL to allow the inter-packet communication (and any packet modification) to complete before the packets 412, 416 reach the HOL and become eligible for scheduling for transmission from the network switch 400. Some embodiments of the packet communication switch 420 compare the state of the ML information stored in the packets 412, 416 to determine which of the packets 412, 416 includes more evolved ML information, such as a more evolved value learning matrix that is determined using more iterations of a reinforcement learning process, as discussed below. The more evolved ML information is then used to modify the headers of one or more of the packets 412, 416. For example, if the packet 416 includes more evolved ML information than the packet 412, the header of the packet 412 is modified to include the more evolved ML information. The modified packet 412 therefore conveys the more evolved ML information and therefore benefits from additional learning that occurred prior to the packet 412 arriving at the network switch 400.

Some embodiments of the packet communication switch 420 store ML information that is used to perform the actions. For example, the packet communication switch 420 can store ML information 440, 445 that is used to schedule the packets 411-417 for transmission from their corresponding queues 405, 410. The ML information 440, 445 can be updated based on ML information in the headers of the packets 411-417. The ML information 440, 445 can also be used to update or modify the ML information in the headers of the packets 411-417 prior to transmission from the network switch 400. Some embodiments of the packet communication switch 420 (sometimes in conjunction with the packet communication switch 420) perform other actions including, but not limited to, configuring data plane, control plane, or management plane functionality in the network switch 400. For example, the packet communication switch 420 can use the ML information 440, 445 to configure a network slice to support a service chain, allocate flows at a hybrid access gateway, monitor and manage congestion of the queues 405, 410, selectively provide a class of service, manage energy consumption in the network switch, allocate hardware resources of the network switch 400, allocate available acceleration devices, and manage a number of treated traffic flows.

A queue server 435 performs one or more actions at the network switch 400 including scheduling the packets 411-417 for transmission from the network switch 400. For example, the queue server 435 can schedule packets from the HOL of the queues 405, 410 for transmission from the network switch 400.

Figure 5:
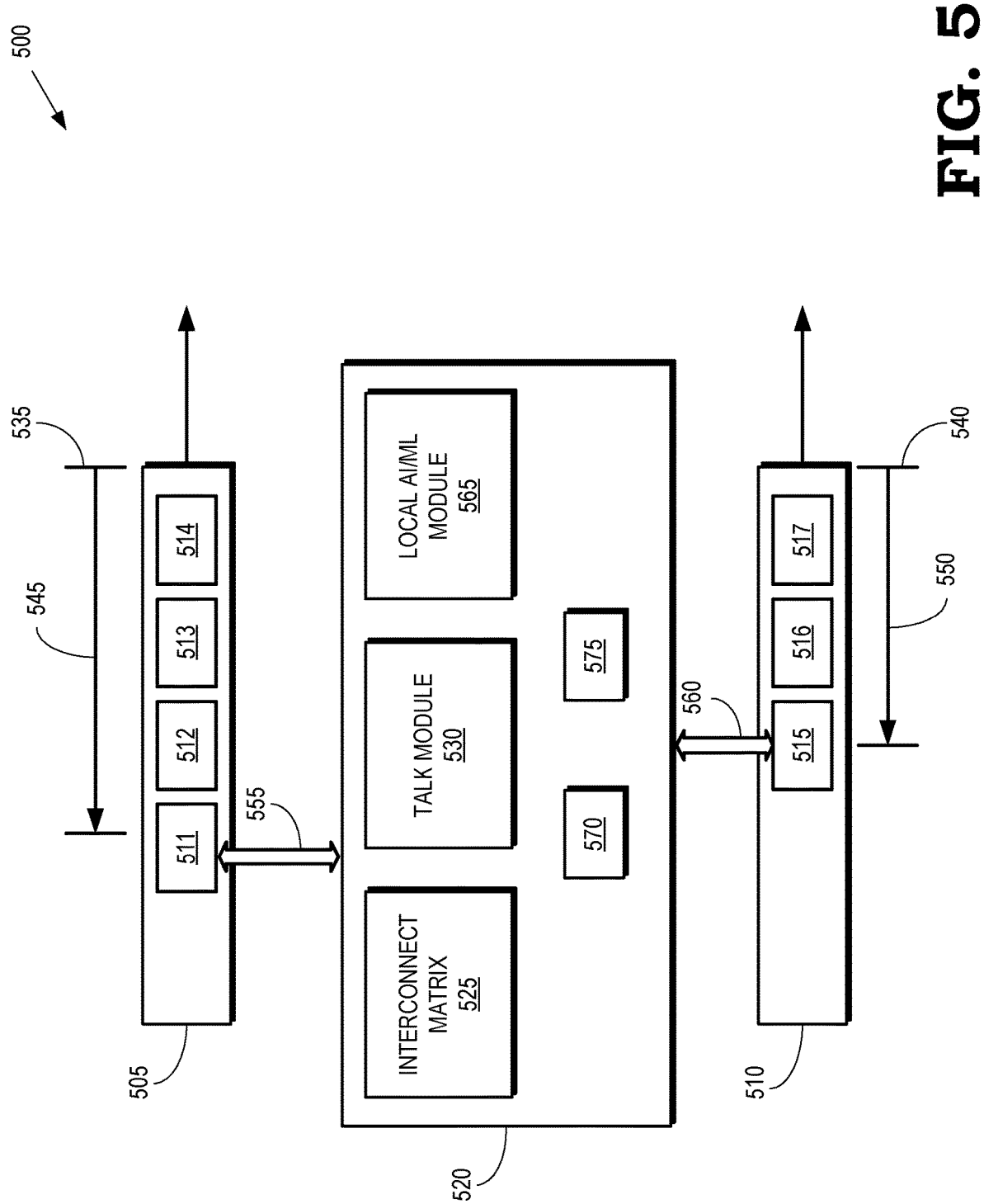
FIG. 5 is a block diagram of a portion of a network switch that supports inter-packet communication of ML information according to some embodiments.

FIG. 5 is a block diagram of a portion 500 of a network switch that supports inter-packet communication of ML information according to some embodiments. The portion 500 is implemented in some embodiments of the network switches 110-117 shown in FIG. 1 and the network switch 400 shown in FIG. 4. The portion 500 includes two or more queues 505, 510 that hold packets 511, 512, 513, 514, 515, 516, 517 (collectively referred to herein as the "packets 511-517") that arrive at the network switch from corresponding input flows. The portion 500 also includes a packet communication switch 520 that facilitates communication or exchange of information between the packets 511-517 in the different queues 505, 510. The queues 505, 510 and the packet communication switch 520 are used to implement some embodiments of the queues 405, 410 and the packet communication switch 420 shown in FIG. 4.

The packet communication switch 520 includes an interconnect matrix 525 that provides a physical interconnection between the packets 511-517 in the queues 505, 510 that are in communication with each other, i.e., "talking." Some embodiments of the interconnection matrix 525 are implemented as a crossbar switch or set of multiplexers that are configured to provide communication pathways between selected ones of the packets 511-517 using signals provided by a talk module 530.

The talk module 530 controls the inter-packet communication between the packets 511-517 in the queues 505, 510. In some embodiments, communication between the packets 511-517 occurs in a sequence of cycles and the duration of each cycle is predetermined or dynamically configured. At the beginning of the cycle, the talk module 530 verifies the service time remaining for the packets 511-517 before the packets reach the HOL of the corresponding queues 505, 510. The HOL of the queue 505 is indicated by the line 535 and the HOL of the queue 510 is indicated by the line 540. A time interval indicating the service time for the packet 511 is indicated by the arrow 545 and a time interval indicating the service time for the packet 515 is indicated by the arrow 550. The talk module 530 identifies packets that are eligible to talk via the packet communication switch 520 based on their service time intervals. In some embodiments, packets 511-517 are eligible to talk if their corresponding service time intervals are greater than a threshold that is determined by a maximum packet latency. For example, the service time interval 545 for the packet 511 and the service time interval 550 for the packet 515 are both greater than the threshold and the packets 511, 515 can therefore talk via the interconnection matrix 525, as indicated by the double-headed arrows 555, 560.

Inter-packet communication (i.e., "talking") is defined herein as the exchange of artificial intelligence (AI) or ML related information between the packets 511-517 while they are held in the queues 505, 510. In some embodiments, reinforcement learning (or Q-learning) is implemented in the network switch to learn actions that tend to optimize some aspect of the performance of the network switch for a set of actions. The ML related information stored in headers of the packets 511-517 corresponds to the ML related information that is used by the network switch to choose actions that are performed in various states, as discussed herein. Talking between the packets 511-517 includes exchanging their respective ML related information such as values of entries in value learning matrices (or Q-matrices) stored in the headers of the packets 511-517. Talking can also include exchanging other information such as the number of iterations of the reinforcement learning process that were performed to generate the corresponding value learning matrices. The talk module 530 determines which of the headers includes more evolved values of the ML related information. In some embodiments, the talk module 530 determines the more evolved value learning matrix based on the number of iterations of the reinforcement learning process that have been performed to generate the value learning matrix. Larger numbers of iterations indicate more evolved matrices. The talk module 530 updates or modifies the headers of the talking packets 511-517 based on the more evolved values of the ML related information, e.g., by replacing the less evolved values in one of the talking packets 511-517 with the more evolved values in the other one of the talking packets 511-517. The more evolved values of the ML information are therefore propagated and distributed throughout the network as the packets 511-517 traverse the network switches in the network.

Some embodiments of the packet communication switch 520 include a local AI/ML module 565 that updates or modifies the headers of the packets 511-517. For example, the local AWL module 565 can access the values of the ML information in the headers of the talking packets 511-517 and generate new values of the ML information that may not be the same as the values in either of the headers. Instead, the local AI/ML module 565 "learns" how to modify the values of the ML information based on the header information in previously processed packets. Some embodiments of the packet communication switch 520 store ML information 570, 575 that is associated with the queues 505, 510, respectively. The ML information 570, 575 corresponds to the ML information 440, 445 shown in FIG. 4. The local AWL module 565 can access the ML information 570, 575 to perform various operations including aspects of the method 700 disclosed in FIG. 7, as discussed herein.

Figure 6:
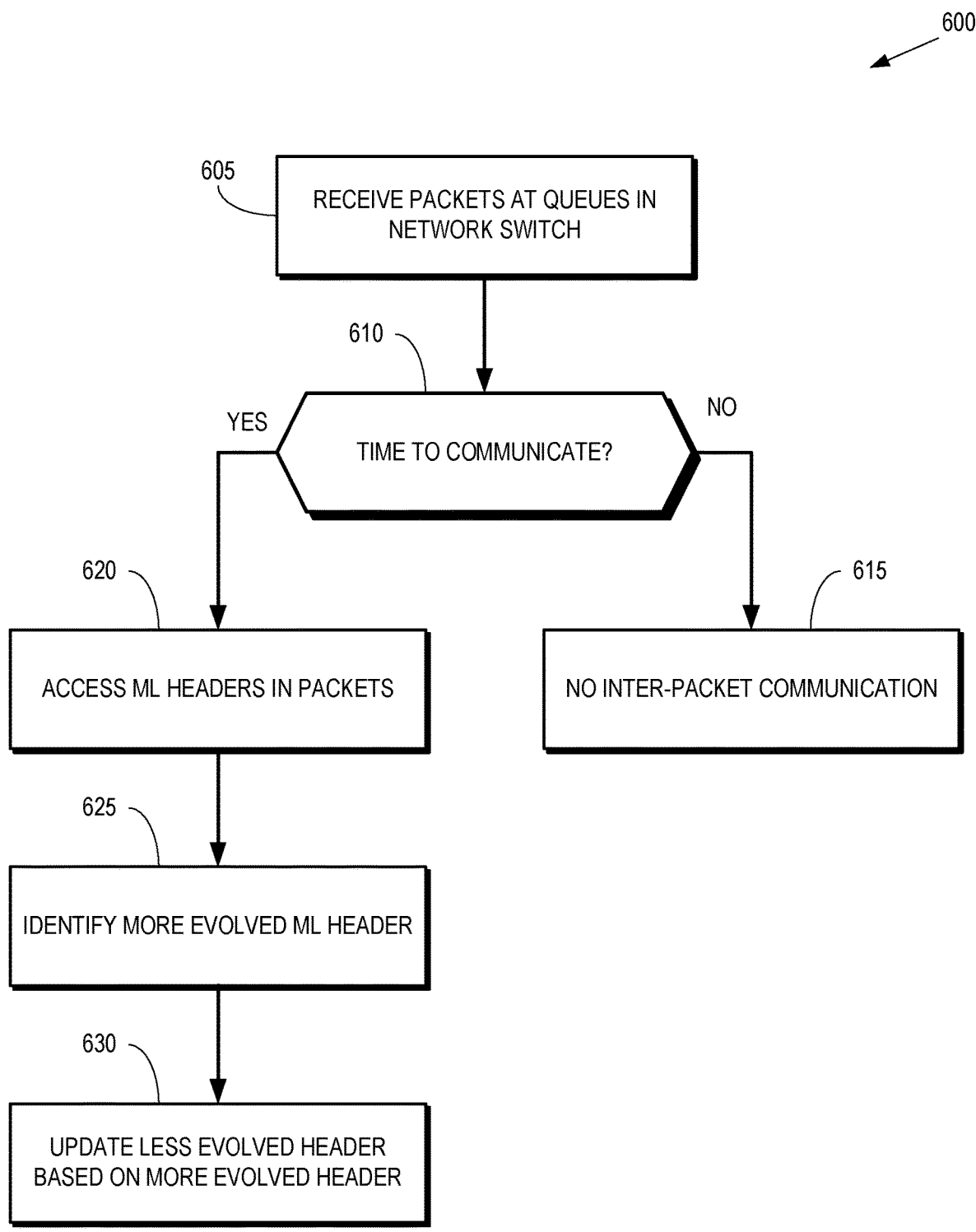
FIG. 6 is a flow diagram of a method of selectively modifying the ML information in headers of packets during inter-packet communication according to some embodiments.

FIG. 6 is a flow diagram of a method 600 of selectively modifying the ML information in headers of packets during inter-packet communication according to some embodiments. The method 600 is implemented in some embodiments of the communication system 100 shown in FIG. 1, the network switch 400 shown in FIG. 4, and the portion 500 of the network switch shown in FIG. 5. The method 600 corresponds to one cycle of the processing performed by the talk module 530 shown in FIG. 5.

At block 605, packets are received at the queues in the network switch from corresponding input flows. At decision block 610, the network switch determines which packets have sufficiently long service time intervals to complete a cycle of talking before they reach the HOL of their corresponding queues. If none of the packets in the queues have a sufficiently long service time interval, the method 600 flows to the block 615 and the network switch and bypasses inter-packet communication. If one or more packets in at least two of the queues have a sufficiently long service time interval, the method 600 flows to the block 620.

At block 620, a packet communication switch in the network switch accesses the ML headers in the packets that are performing inter-packet communication. As discussed herein, the ML headers include ML information such as value learning matrices associated with the packets. At block 625, the packet communication switch identifies the more evolved ML header from among the ML headers of the packets that are performing inter-packet communication. At block 630, the packet communication switch updates the less evolved ML header based on values of the ML information in the more evolved ML header.

Figure 7:
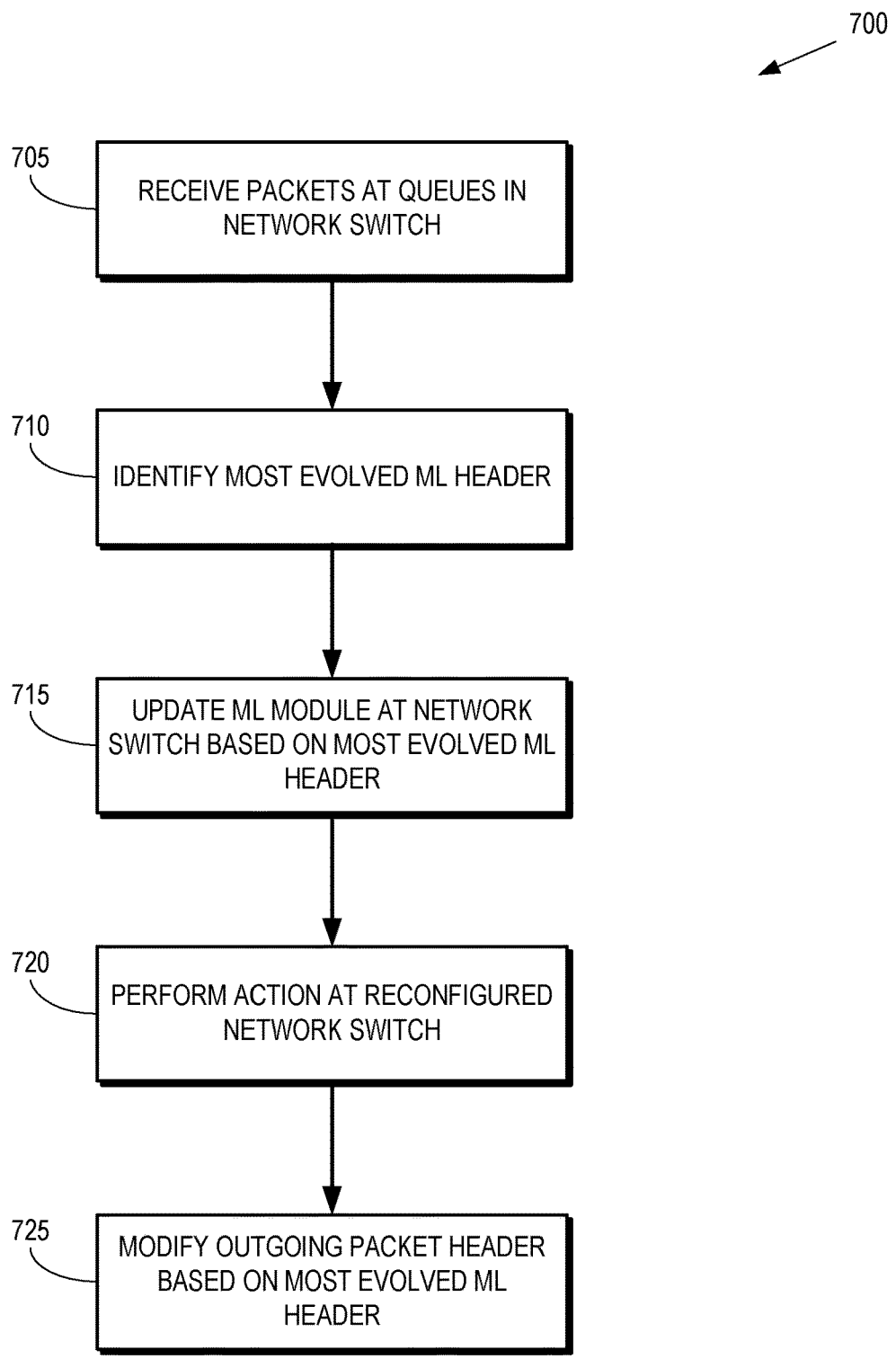
FIG. 7 is a flow diagram of a method of updating the ML information used to perform actions at a network switch based on the ML information in headers of packets according to some embodiments.

FIG. 7 is a flow diagram of a method 700 of updating the ML information used to perform actions at a network switch based on the ML information in headers of packets according to some embodiments. The method 700 is implemented in some embodiments of the communication system 100 shown in FIG. 1, the network switch 400 shown in FIG. 4, and the portion 500 of the network switch shown in FIG. 5. For example, the method 700 is implemented in some embodiments of the local AI/ML module 565 shown in FIG. 5.

At block 705, packets are received in the queues of a network switch from corresponding incoming flows. At block 710, more evolved ML headers are identified in the packets and the headers of packets that are being processed by the network switch are updated or modified based on the most evolved ML information, as discussed herein. At block 715, one or more ML modules at the network switch are updated based on the most evolved ML information received in the packets. For example, the queue server 435 shown in FIG. 4 can use information received in the ML headers of one or more of the packets 411-417 to update or modify the ML modules 440, 445 shown in FIG. 4.

At block 720, the reconfigured network switch performs one or more actions, e.g., based on the updated or modified ML modules. As discussed herein, some embodiments of the reconfigured network switch perform actions including, but not limited to, configuring a network slice to support a service chain, allocating flows at a hybrid access gateway, scheduling packets for transmission from the queues in the network switch, managing congestion of the queues, selectively providing a class of service, managing energy consumption in the network switch, allocating hardware resources of the network switch, allocating available acceleration devices, and managing a number of treated traffic flows.

Some embodiments of the network switch modify (at the block 725) the header in outgoing packets based on the most evolved ML information. For example, ML modules in the network switch can be updated or modified based on feedback received from the network and the ML information in a header of an outgoing packet can be updated or modified based on the updated/modified ML modules prior to forwarding the packet to its next hop.

Figure 8:
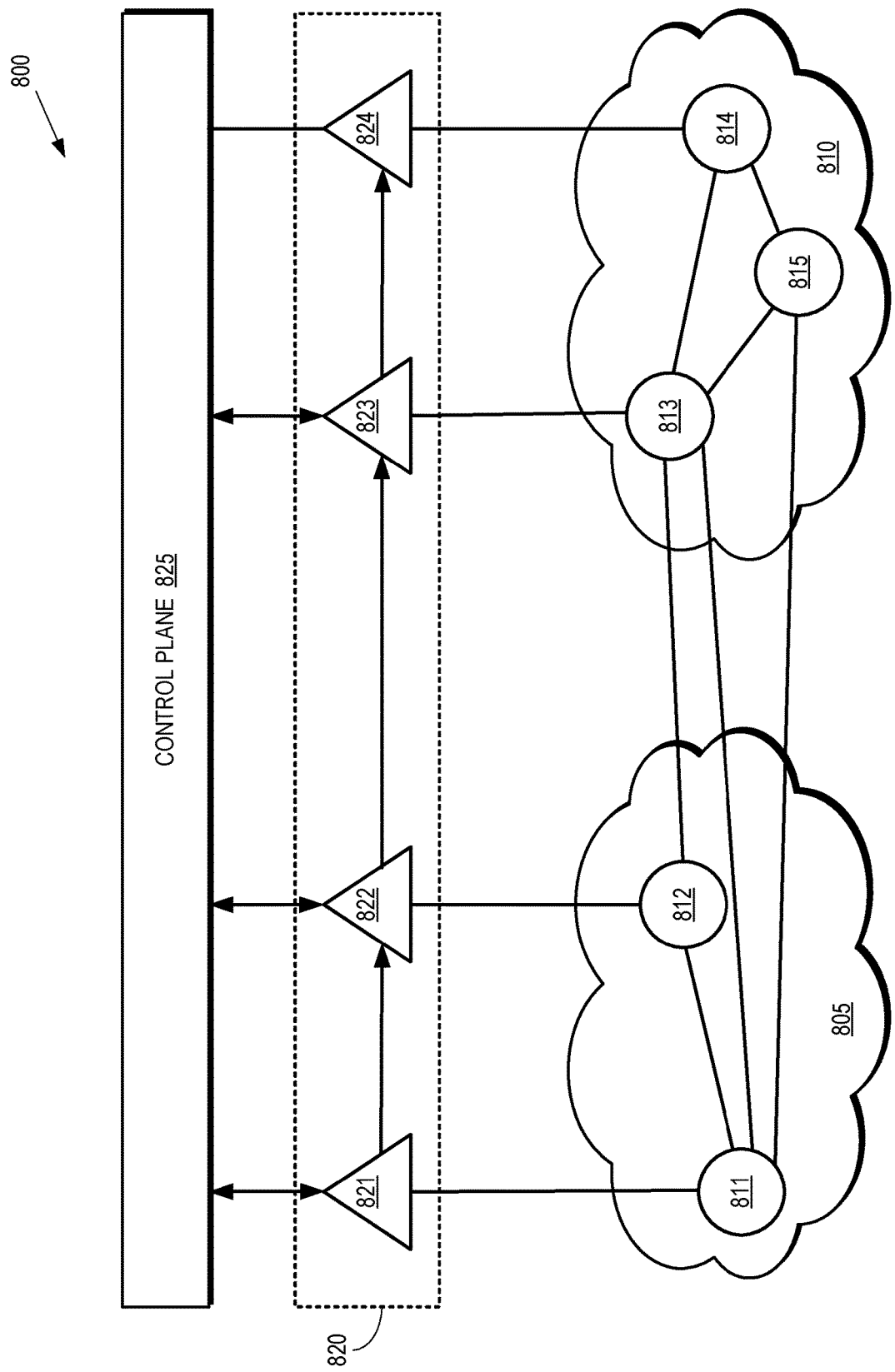
FIG. 8 is a block diagram of a communication system that implements service chaining according to some embodiments.

FIG. 8 is a block diagram of a communication system 800 that implements service chaining according to some embodiments. The communication system 800 operates according to Fifth Generation (5G) standards and corresponds to some embodiments of the communication system 100 shown in FIG. 1 and the NFV architecture 200 shown in FIG. 2. The communication system 800 includes an edge cloud 805 and a central cloud 810, which include the nodes 811, 812, 813, 814, 815 that are collectively referred to herein as "the nodes 811-815." Some embodiments of the nodes 811-815 are implemented using the network switch 400 shown in FIG. 4 or the portion 500 of the network switch shown in FIG. 5.

The communication system 800 allocates a network slice 820 that is implemented as a set of chain to service functions 821, 822, 823, 824, which are collectively referred to herein as "the service functions 821-824." In the illustrated embodiment, the service functions 821-824 are instantiated at the nodes 811-814, respectively. The network slice 820 provides a user with end-to-end dedicated communication using specific quality-of-service (QoS) requirements such as maximum latencies, minimum throughput, and the like. The QoS requirements are set forth in a service level agreement (SLA) accepted by the user. The service functions 821-824 in the network slice 820 are configured using signaling packets that are transmitted by the control plane 825 via network links between the nodes 811-815. In the illustrated embodiment, the nodes 811-814 use ML techniques to learn and apply routing rules for routing the signaling packets over the network links during setup of the service chain in the network slice 820. The signaling packets include ML headers that hold ML information such as value learning matrices that are used to learn and apply the routing rules.

FIG. 9 illustrates two value learning matrices 900, 901 in different evolutionary states according to some embodiments. The value learning matrices 900, 901 (also referred to as Q and Q' in FIG. 9) are used by the nodes 811-814 to learn and apply routing rules for signaling packets that are used to set up the service chain in the network slice 820. In the illustrated embodiment, the value learning matrix 900 is less evolved and the values of the entries in the value learning matrix 900 are determined based on fewer iterations of a reinforcement learning process. For example, the less evolved entries are referred to as (a, b, c, d, e, f, g, h, i). The value learning matrix 901 is more evolved and the values of the entries in the value learning matrix 901 are determined based on more iterations of the reinforcement learning process. For example, the more evolved entries are referred to as (a', b', c', d', e', f', g', h', j', k', l', m').

Figure 10:
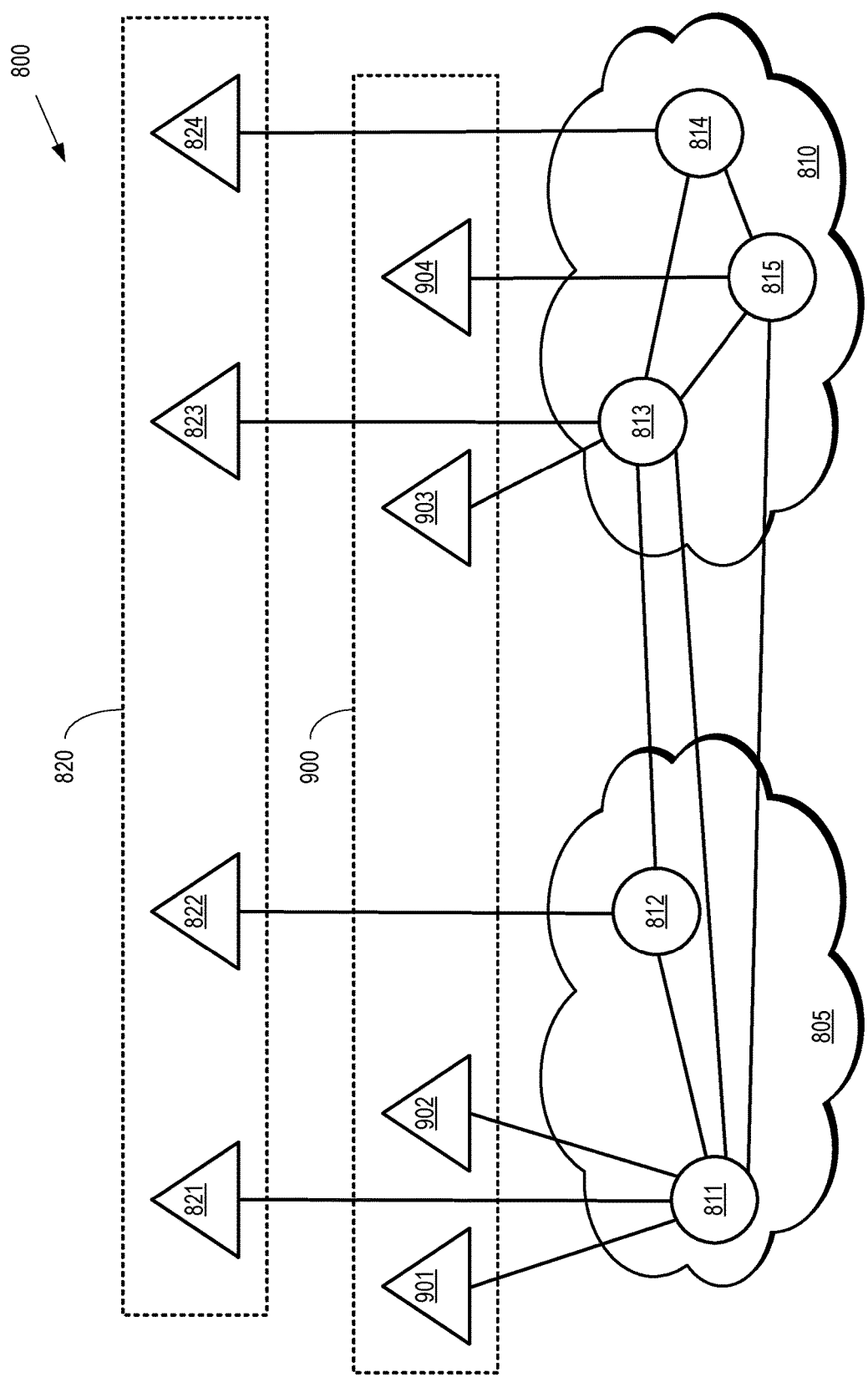
FIG. 10 is a block diagram of the communication system that uses inter-packet exchange to accelerate machine learning for setup of service chains according to some embodiments.

FIG. 10 is a block diagram of the communication system 800 that uses inter-packet exchange to accelerate machine learning for setup of service chains according to some embodiments. As discussed herein, the communication system 800 operates according to 5G standards and corresponds to some embodiments of the communication system 100 shown in FIG. 1 and the NFV architecture 200 shown in FIG. 2. The communication system 800 includes the edge cloud 805 and the central cloud 810, which include the nodes 811-815. Some embodiments of the nodes 811-815 are implemented using the network switch 400 shown in FIG. 4 or the portion 500 of the network switch shown in FIG. 5. As discussed herein with regard to FIG. 8, the network slice 820 is formed using a service chain of the service functions 821-824 that are implemented on corresponding nodes 811-814.

In the illustrated embodiment, a second network slice 900 is set up in the communication system 800 using the service functions 901, 902, 903, 904 (collectively referred to herein as "the service functions 901-904") at the nodes 811, 812, 813, 815, respectively (collectively referred to herein as "the nodes 811-815"). Control plane signaling packets are transmitted between the nodes 811-815 to set up the service functions 901-904. The nodes 811-815 implement different queues for one incoming flow that carries the control plane signaling packets for the service chain in the network slice 820 and another incoming flow that carries the control plane signaling packets for the service chain in the network slice 900. The nodes 811-815 also implement inter-packet communication to exchange ML information included in the ML headers of the control plane signaling packets. For example, packets in the flows associated with both network slices 820, 900 are processed in the node 812. A packet communication switch in the node 812 therefore supports talking between the packets in the different queues, as well as updating and modifying the ML headers of the packets, as discussed herein. If the network slice 820 is configured before the network slice 900, the control plane signaling packets for the network slice 900 benefit from the previous iterations of the reinforcement learning process performed for the network slice 820, e.g., by using the more involved ML information for the network slice 820 to learn to route the control plane signaling packets for the network slice 900.

Figure 11:
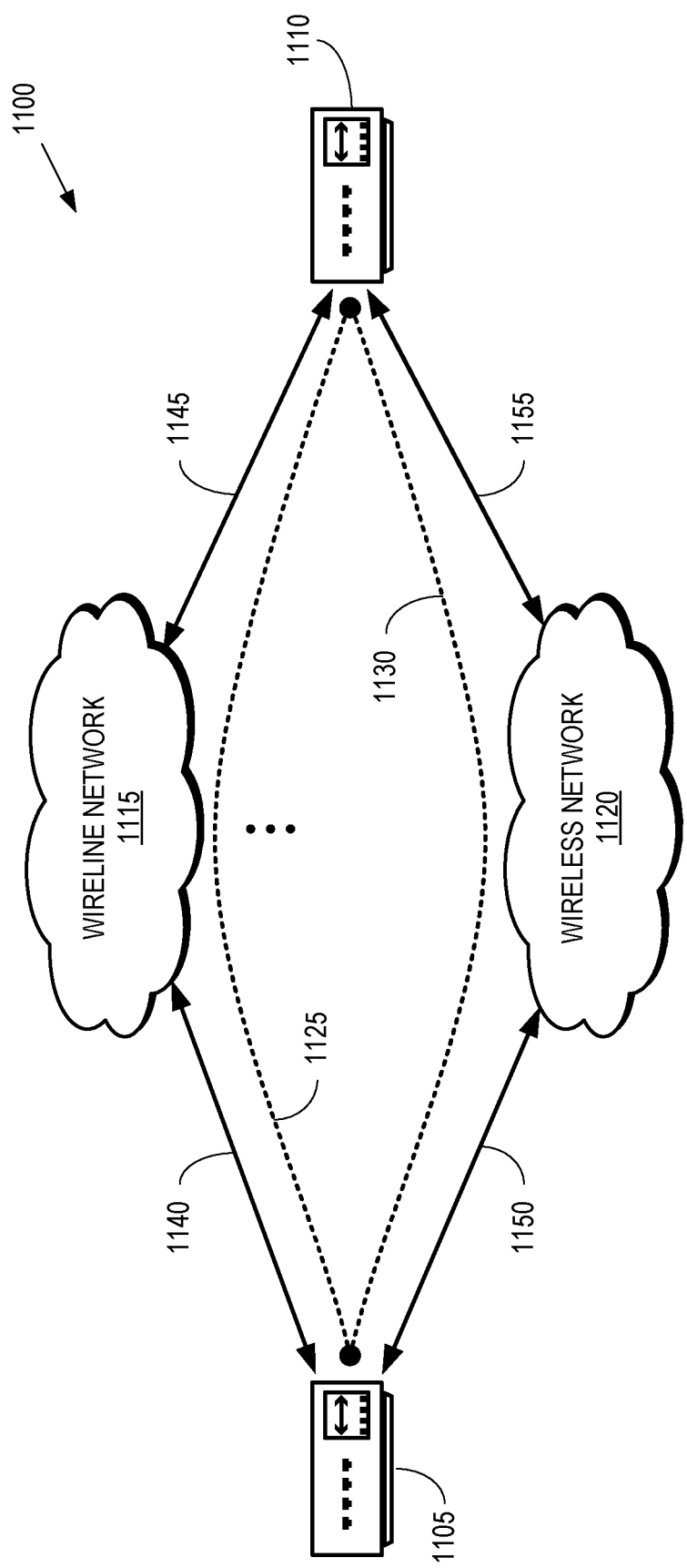
FIG. 11 is a diagram of a communication system that supports hybrid access over a plurality of communication links according to some embodiments.

FIG. 11 is a diagram of a communication system 1100 that supports hybrid access over a plurality of communication links according to some embodiments. The communication system 1100 includes gateways 1105, 1110 that are configured to exchange messages over various networks. Although gateways 1105, 1110 are shown in FIG. 11, similar principles are used to convey messages over multiple paths between other network entities such as user equipment, base stations, servers, customer premises equipment (CPE), modems, vehicles, IoT devices, and the like. Thus, multipath communication in accordance with the techniques disclosed herein can also be performed between the gateways 1105, 1110 and a network entity or between the network entities. Furthermore, in some embodiments, one or more direct paths are formed between the gateways 1105, 1110 using machine-to-machine protocols, device-to-device protocols, vehicle-to-vehicle protocols, and the like. Although FIG. 11 illustrates point-to-point communication, the hybrid access techniques disclosed herein can also be implemented in communication systems that implement point-to-multipoint communication such as broadcast or multicast.

The communication system 1100 supports one or more wireline networks 1115 and one or more wireless networks 1120. A single wireline network 1115 and a single wireless network 1120 are shown in FIG. 11 in the interest of clarity. However, some embodiments of the communication system 1100 include more than one wireline network 1115 or more than one wireless network 1120, multiple wireline networks 1115 and no wireless networks, or multiple wireless networks 1120 and no wireline networks 1115. The wireline network 1115 operates according to an access technology such as digital subscriber line (DSL) connectivity, data over cable service interface specification (DOCSIS), and the like. The wireless network 1120 operates according to one or more other access technologies defined by standards such as Long Term Evolution (LTE) standards defined by the Third Generation Partnership Project (3GPP) to support communication in licensed or unlicensed frequency bands, Wi-Fi standards defined by the IEEE to support communication in unlicensed frequency bands in a wireless local area network (WLAN), satellite links, and the like. As used herein, the term "access technology" refers to a set of standards and corresponding physical devices or connections that are used to support communication between entities in the communication system 1100. One access technology is different than another access technology if the two access technologies do not require each other to support communication. For example, the access technologies used for the wireline network 1115 are different than the access technologies used for the wireless network 1120. For another example, the DSL access technology is different than the DOC SIS access technology and the LTE access technology is different than the Wi-Fi access technology.

The gateways 1105, 1110 exchange packets by transmitting the packets over multiple paths 1125, 1130 that traverse the wireline network 1115 and the wireless network 1120, respectively. The path 1125 is formed using a communication link 1140 between the gateway 1105 and the wireline network 1115 and the communication link 1145 between the wireline network 1115 and the gateway 1110. The path 1130 is formed using a communication link 1150 between the gateway 1105 and the wireless network 1120 and a communication link 1155 between the wireless network 1120 and the gateway 1110. However, in some embodiments, the gateways 1105, 1110 can exchange packets over multiple paths that traverse the wireline network 1115, multiple paths that traverse the wireless network 1120, direct links that bypass the networks, or any combination thereof. Furthermore, in some embodiments, the individual paths 1125, 1130 are formed of a combination of communication links through wireless and wireline networks.

The gateways 1105, 1110 use hybrid access techniques to combine or aggregate the paths 1125, 1130 into a single multipath connection between the gateways 1105, 1110. Hybrid access can be performed in different layers of the network stack including the Internet protocol (IP) layer, the network layer, and the like. Hybrid access techniques are implemented by performing hybrid access on the transport layer or a higher layer of the network stack such as the application layer. Some embodiments of hybrid access techniques are implemented in a network-agnostic manner. Examples of hybrid access techniques include multipath transmission control protocol (MPTCP), which aggregates multiple TCP sessions between the same endpoints, and multipath quick user datagram protocol (UDP) Internet connection (MPQUIC), which aggregates multiple paths for transmitting packets between the same hosts.

Some embodiments of the gateways 1105, 1110 implement multipath communication at the application layer according to the MPQUIC protocols, which utilize the cryptographic and transport handshakes defined by the QUIC protocol for establishing secure connections with a relatively low latency. The QUIC protocol also supports congestion control, multiplexing, authentication and encryption of headers and payloads, stream and connection flow control, forward error correction, and connection migration. The MPQUIC protocol supports pooling of resources of the paths 1125, 1130 established according to the QUIC protocol, selection of one of the paths 1125, 1130 based on quality, and increased resilience of the connection between the gateways 1105, 1110.

Packet schedulers (not shown in FIG. 11) implemented in the gateways 1105, 1110 schedule packets for transmission over one or more of the paths 1125, 1130. Some embodiments of the packet schedulers include a congestion controller that partitions congestion window buffers into separate buffers for different streams. Some embodiments of the packet schedulers implemented in the gateways 1105, 1110 use ML information to support actions including making scheduling decisions for the packets for transmission over the paths 1125, 1130, selection or aggregation of the paths 1125, 1130, congestion control, and the like. The gateways 1105, 1110 therefore support inter-packet communication for the exchange of ML information between the headers of packets that are being processed in the gateways 1105, 1110.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   accessing a first header of a first packet in at least one queue of a network switch, the first header comprising first machine learning (ML) information that represents a first set of state transition probabilities under a set of actions performed at the network switch;
   accessing a second header of a second packet in the at least one queue of the network switch, the second header comprising second ML information that represents a second set of state transition probabilities under the set of actions performed at the network switch; and
   selectively modifying at least one of the first header and the second header based on a comparison of the first ML information and the second ML information.

2. The method of claim 1, wherein accessing the first ML information from the first header of the first packet comprises accessing a first value learning matrix generated using reinforcement learning, and wherein accessing the second ML information from the second header of the second packet comprises accessing a second value learning matrix generated using reinforcement learning.

3. The method of claim 2, wherein selectively modifying the at least one of the first header and the second header comprises determining a more evolved one of the first value learning matrix and the second value learning matrix and modifying the first header and the second header to include the more evolved one of the first value learning matrix and the second value learning matrix.

4. The method of claim 1, further comprising:
   selecting the first packet from packets in the at least one queue based on a position of the first packet relative to at least one head-of-line (HOL) position of the at least one queue; and
   selecting the second packet from packets in the at least one queue based on a position of the second packet relative to the at least one HOL position of the at least one queue.

5. The method of claim 4, wherein selecting the first packet comprises selecting the first packet in response to a first service time remaining before the first packet reaches a first HOL position of a first queue being above a threshold, and wherein selecting the second packet comprises selecting the second packet in response to a second service time remaining before the second packet reaches a second HOL position of a second queue being above the threshold.

6. The method of claim 5, wherein the threshold indicates a time interval required to exchange the first and second headers.

7. The method of claim 1, further comprising:
   reconfiguring the network switch based on at least one of the first ML information and the second ML information; and
   performing an action at the reconfigured network switch.

8. The method of claim 7, wherein reconfiguring the network switch comprises modifying a third value learning matrix based on a more evolved one of a first value learning matrix in the first header and a second value learning matrix in the second header, and wherein performing the action comprises performing the action based on the modified third value learning matrix.

9. The method of claim 8, further comprising:
   evolving the third value learning matrix based on feedback received in response to performing the action.

10. The method of claim 9, further comprising:
modifying at least one of the first ML information in the first header and the second ML information in the second header based on the evolved third value learning matrix prior to transmitting the first packet or the second packet from the network switch.

11. The method of claim 8, wherein performing the action comprises performing at least one of:
configuring a network slice to support a service chain;
allocating flows at a hybrid access gateway;
scheduling packets for transmission from at least one of the at least one queue based on the third value learning matrix;
managing congestion of the at least one queue based on the third value learning matrix;
selectively providing a class of service based on the third value learning matrix;
managing energy consumption in the network switch based on the third value learning matrix;
allocating hardware resources of the network switch based on the third value learning matrix;
allocating available acceleration devices based on the third value learning matrix; and
managing a number of traffic flows based on the third value learning matrix.

12. A network switch comprising:
at least one queue to hold packets received from at least one input flow; and
a packet communication switch configured to access a first header of a first packet in the at least one queue and a second header of a second packet in the at least one queue, the first header comprising first machine learning (ML) information that represents a first set of state transition probabilities under a set of actions performed at the network switch, and the second header comprising second ML information that represents a second set of state transition probabilities under the set of actions performed at the network switch, and wherein the packet communication switch is configured to selectively modify at least one of the first header and the second header based on a comparison of the first ML information and the second ML information.

13. The network switch of claim 12, wherein the packet communication switch comprises:
an execution block that is configured to determine a more evolved one of a first value learning matrix and a second value learning matrix, and the execution block is configured to modify the first header and the second header to include the more evolved one of the first value learning matrix and the second value learning matrix.

14. The network switch of claim 13, wherein the packet communication switch comprises:
an interconnection matrix that physically connects the first packet and the second packet.

15. The network switch of claim 13, wherein the execution block is configured to:
select the first packet from packets in a first queue based on a position of the first packet relative to a first head-of-line (HOL) position of the first queue; and
select the second packet from packets in a second queue based on a position of the second packet relative to a second HOL position of the second queue.

16. The network switch of claim 15, wherein the execution block is configured to select the first packet in response to a first service time remaining before the first packet reaches the first HOL position of the first queue being above a threshold, and wherein the execution block is configured to select the second packet in response to a second service time remaining before the second packet reaches the second HOL position of the second queue being above the threshold.

17. The network switch of claim 16, wherein the threshold indicates a time interval required to exchange the first and second headers.

18. The network switch of claim 17, wherein the packet communication switch comprises:
a local ML algorithm configured to evolve at least one of the first ML information included in the first header of the first packet and the second ML information included in the second header of the second packet.

19. The network switch of claim 14, further comprising:
a queue server configured to perform actions based on a third ML information stored in the queue server.

20. The network switch of claim 19, wherein the third ML information comprises a third value learning matrix, and wherein the third value learning matrix is modified based on a more evolved one of a first value learning matrix in the first header and a second value learning matrix in the second header.

21. The network switch of claim 20, wherein the queue server is configured to evolve the third value learning matrix based on feedback received in response to performing the action.

22. An apparatus comprising:
at least one processor; and
at least one memory including computer program code;
the at least one memory and the computer program code configured to, with the at least one processor, cause the apparatus at least to perform:
accessing a first header of a first packet in at least one queue of a network switch, the first header comprising first machine learning (ML) information that represents a first set of state transition probabilities under a set of actions performed at the network switch;
accessing a second header of a second packet in the at least one queue of the network switch, the second header comprising second ML information that represents a second set of state transition probabilities under the set of actions performed at the network switch; and
selectively modifying at least one of the first header and the second header based on a comparison of the first ML information and the second ML information.

* * * * *